United States Patent
Chiang et al.

(10) Patent No.: US 8,302,060 B2
(45) Date of Patent: Oct. 30, 2012

(54) I/O CELL ARCHITECTURE

(75) Inventors: Renjeng Chiang, Taipei (TW);
Chih-Hsien Chang, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 43 days.

(21) Appl. No.: 12/947,938

(22) Filed: Nov. 17, 2010

(65) Prior Publication Data

US 2012/0124531 A1    May 17, 2012

(51) Int. Cl.
*G06F 17/50* (2006.01)

(52) U.S. Cl. ........ 716/126; 716/118; 716/119; 716/128; 716/135; 716/137; 716/138; 716/55

(58) Field of Classification Search ............ 716/55, 716/118–119, 126, 128, 135, 137–138
See application file for complete search history.

(56) References Cited

U.S. PATENT DOCUMENTS

| | | | |
|---|---|---|---|
| 4,942,317 A * | 7/1990 | Tanaka et al. | 326/37 |
| 5,317,210 A | 5/1994 | Patel | |
| 6,446,250 B1 * | 9/2002 | Becker | 716/122 |
| 6,452,417 B1 | 9/2002 | Moore | |
| 6,499,134 B1 * | 12/2002 | Buffet et al. | 716/113 |
| 6,550,047 B1 * | 4/2003 | Becker | 716/122 |
| 6,667,865 B2 * | 12/2003 | Duvvury et al. | 361/56 |
| 7,340,699 B2 * | 3/2008 | Hayashi | 716/111 |
| 7,488,995 B2 | 2/2009 | Usami et al. | |
| 2002/0004930 A1 * | 1/2002 | Ohno | 716/10 |
| 2004/0128626 A1 * | 7/2004 | Wingren et al. | 716/1 |
| 2010/0131913 A1 * | 5/2010 | Zou et al. | 716/9 |

OTHER PUBLICATIONS

Homer, R.N. et al., "Implementation of Pad Circuitry for Radially Staggered Bond Pad Arrangements", Hewlett-Packard Journal, Dec. 1996, Article 7, pp. 1-5.

* cited by examiner

*Primary Examiner* — Stacy Whitmore
(74) *Attorney, Agent, or Firm* — Duane Morris LLP

(57) ABSTRACT

A system includes a computer readable storage medium and a processor. The computer readable storage includes data representing an input/output ("I/O") cell of a first type for modeling and/or fabricating a semiconductor device. The I/O cell of the first type includes circuitry for providing a first plurality of functions. The processor is in communication with the computer readable storage medium and is configured to select the I/O cell of the first type, arrange a plurality of the I/O cells of the first type on a model of an semiconductor device, and store the model of the semiconductor device including the plurality of the I/O cells of the first type in the computer readable storage medium.

20 Claims, 6 Drawing Sheets

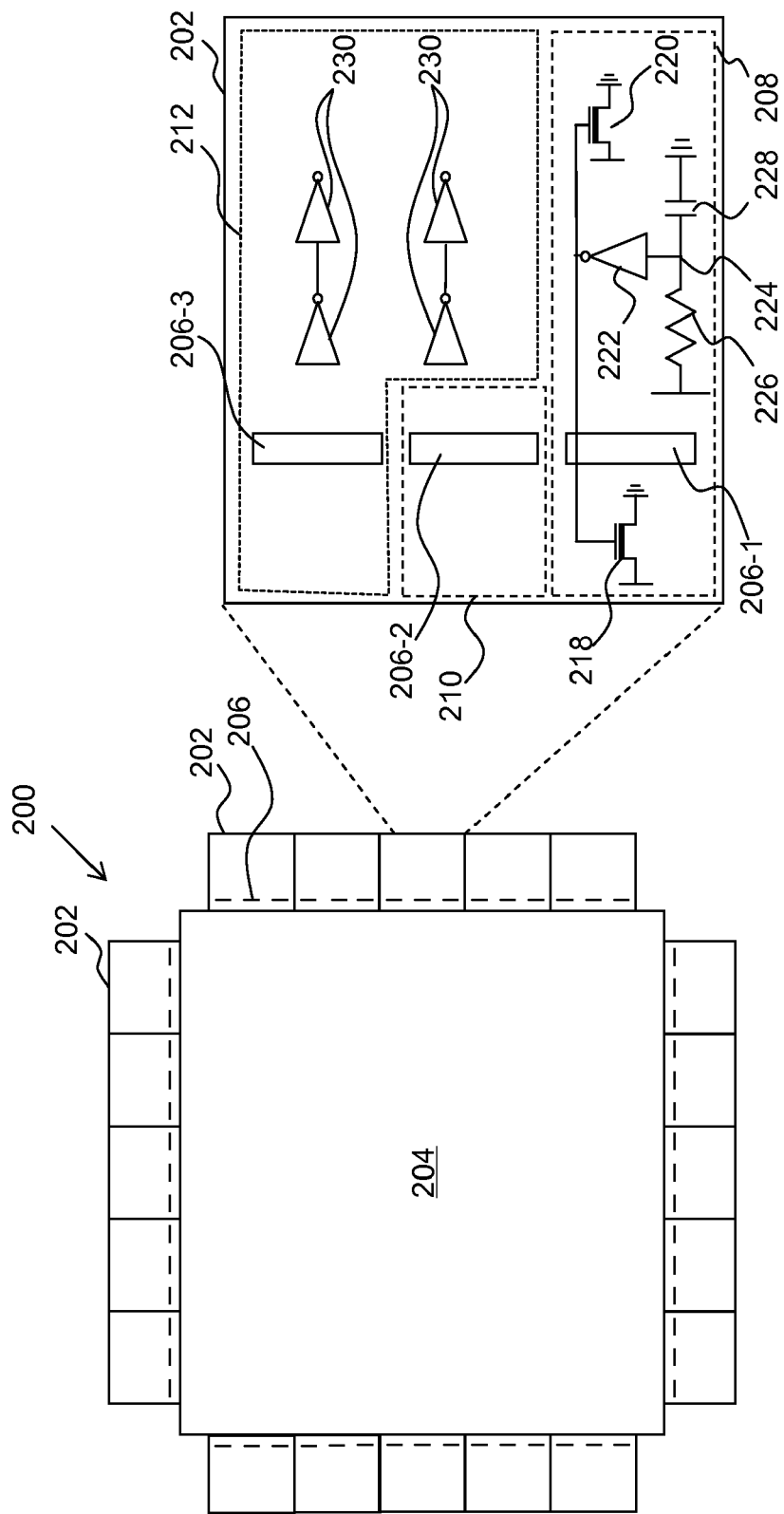

I/O CELL ARCHITECTURE

FIELD OF DISCLOSURE

The disclosed systems and methods relate to integrated circuits. More specifically, the disclosed systems and methods relate to the layout and architecture of an input/output ("I/O") cell of an integrated circuit ("IC").

BACKGROUND

I/O cells are provided on IC chips to enable signals and power to be routed between one IC chip and another IC chip or device. Conventionally, each I/O cell is provided with a certain unique purpose such as providing a specific function or power level, e.g., ground or operating voltage.

As integrated circuits continue to decrease in size, the bonding pitch for each I/O cell is also decreased. The decrease in bonding pitch for I/O cells results in the internal interconnects of the I/O cells being comparatively lengthened, which increases the influence of the interconnect capacitance. Additionally, the decrease in bonding pitch results in a greater potential for electromigration due to thinner interconnects distributing the same amount of power to and from the IC chip.

BRIEF DESCRIPTION OF THE DRAWINGS

FIG. 2A is a plan view of one example of an integrated circuit including a plurality of I/O cells.

FIG. 2B is a schematic illustration of one example of an I/O cell of the integrated circuit illustrated in FIG. 2A.

DETAILED DESCRIPTION

Figure 1:
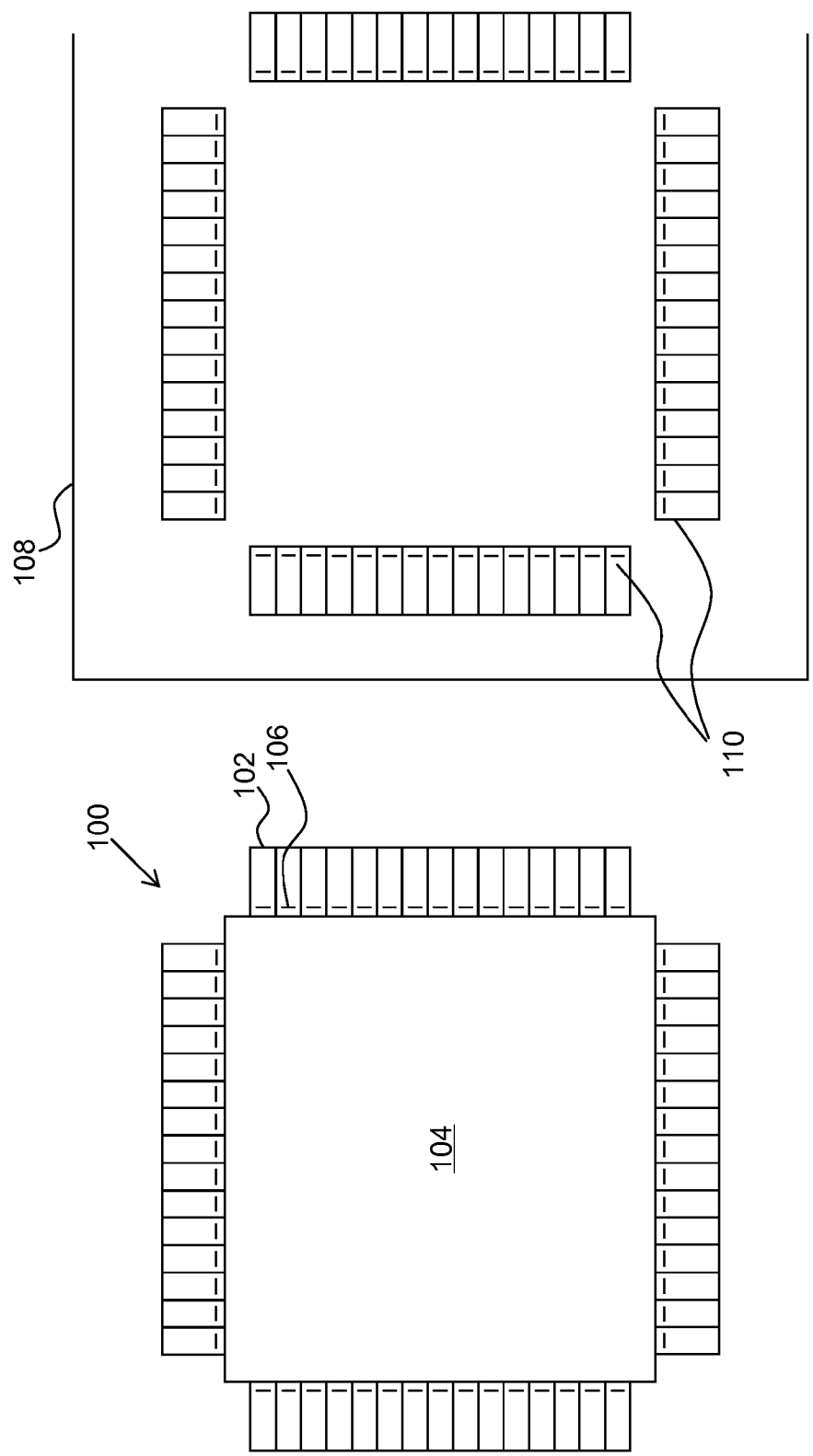
FIG. 1 is a plan view of an integrated circuit and a substrate having corresponding I/O cell and bonding pad locations.

FIG. 1 illustrates an integrated circuit ("IC") 100 including a plurality of input/output ("I/O") cells 102 disposed around the periphery of active area 104. Each I/O cell 102 includes an I/O pad 104 for bonding or otherwise coupling to another IC, device, or substrate 108 having a plurality of corresponding bonding pads 110 as will be understood by one skilled in the art. The pitch dimensions for the I/O bonding pads 104 (the pad-to-pad repeat distance on a chip) is typically standardized across the industry by the International Technology Roadmap for Semiconductors ("ITRS") for each processing technology. The pitch dimension for the I/O bonding pads dictates the height of the I/O cell (referred to herein as "I/O cell pitch").

FIG. 2A illustrates one example of an IC 200 including a plurality of I/O cells 202 having an improved architecture and being disposed around the periphery of the active area 204 of IC 200. I/O cells 202 include circuitry 208, 210, and 212 for providing multiple functionalities within a single I/O cell 202 (e.g., data transfer, ground level, operating voltage, or the like). By grouping a plurality of functions into a single I/O cell 202, the full area and metal resources of the I/O cell may be utilized and shared across all of the function-specific circuitry of the I/O cell.

For example, FIG. 2B illustrates one example of an improved I/O cell 202 that includes a plurality of bonding pads 206-1, 206-2, and 206-3 (collectively referred to as "bonding pads 206") and circuitry for supplying the ground and operating voltages 208 as well as data transport 210, 212 to IC 204. I/O cell 202 may include circuitry for providing other functionality such as an electrostatic discharge ("ESD") trigger or clamp circuit as will be understood by one skilled in the art.

Each of the plurality of bonding pads 206 of an I/O cell 202 is coupled to a respective circuit for outputting to corresponding bonding pad 110 located on substrate 108. For example, bonding pad 206-1 is coupled to circuitry 208 that provides operating voltage $V_{DD}$. Specifically, circuitry 208 includes a metal-oxide semiconductor ("MOS") transistor 218 having its drain coupled to a voltage source node set at $V_{DD}$, its source coupled to ground, and its gate coupled to the gate of MOS transistor 220 and to the output of inverter 222. MOS transistor 220 has its drain coupled to a voltage source node set at $V_{DD}$ and its source coupled to ground. Inverter 222 has its input coupled to node 224, which is disposed between a resistor 226 and a capacitor 226 to provide an RC circuit. Conventionally, two separate I/O cells were required to provide both MOS transistors 218 and 220, which resulted in at least a five percent increase in area in order to accommodate multiple inverters 222, resistors 226, and capacitors 228.

Figures 3, 4:
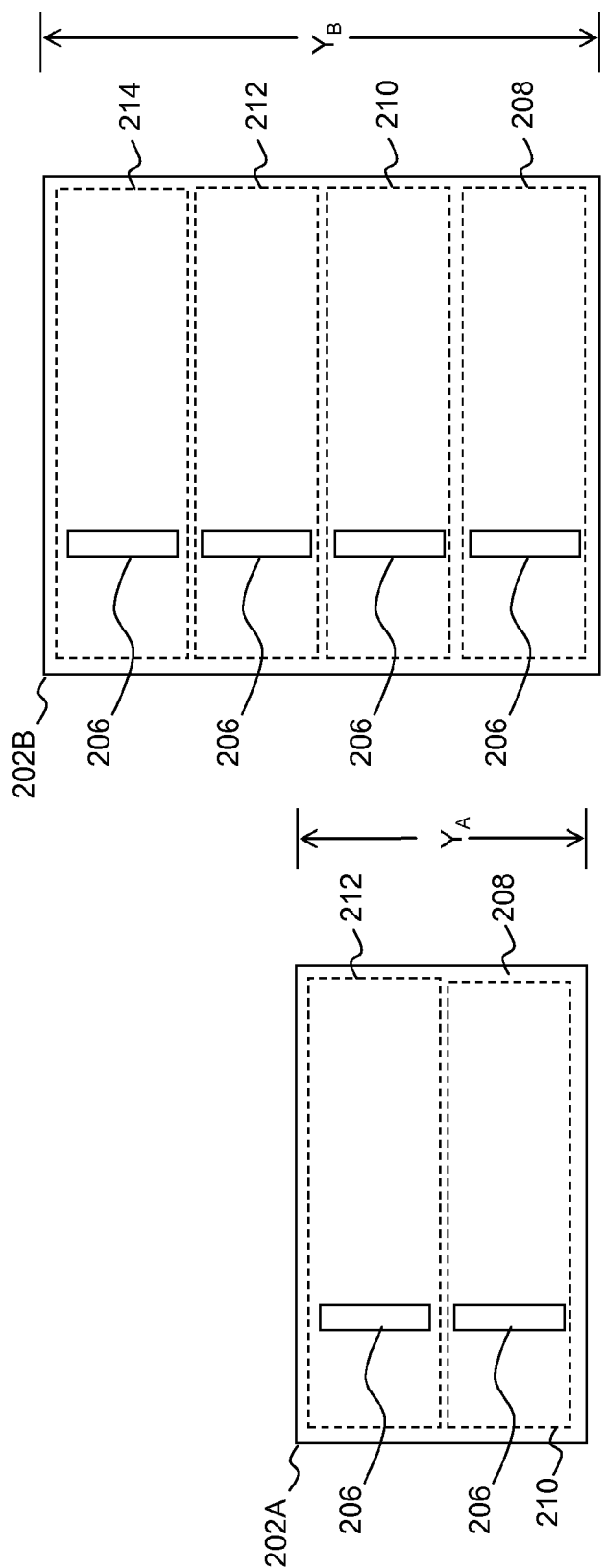
FIG. 3 is a schematic illustration of another example of an I/O cell of an integrated circuit.
FIG. 4 is a schematic illustration of another example of an I/O cell of an integrated circuit.

Bonding pad 206-2 provides ground connection to circuitry 212 and 208, and bonding pad 206-3 is coupled to circuitry 212. Circuit 212 is configured to provide data transfer functions to and from the IC and include inverter pairs 230 and 232. Although I/O cell 202 is illustrated as including three bonding pads 206 in FIG. 2B, one skilled in the art will understand that each I/O cell may include fewer or more bonding pads and circuitries as illustrated in FIGS. 3 and 4. In some embodiments, the I/O cell pitch is based on the number of bonding pads and/or functions provided by the I/O cell. One skilled in the art will understand that a number of different types of circuitry for performing different functions may be implemented in an I/O cell.

FIG. 3 illustrates one example of an I/O cell 202A including two bonding pads 206 each associated with a circuitry 208, 210, and FIG. 4 illustrates one example of an I/O cell 202B including four bonding pads 206, each associated with a respective circuit 208, 210, 212, and 214 that provides a specific function. Consequently, the I/O cell pitch dimension may vary according to the number of bonding pads 206 included in the I/O cell. In one embodiment, the I/O cell pitch dimension "Y" may be a multiple of the I/O cell pitch dimension in accordance with the dimensions set forth by the ITRS for the applicable semiconductor processing technology. For example, if the I/O cell pitch dimension set forth by the ITRS is 20 µm, then I/O cell 200A with two bonding pads 206 may have an I/O cell pitch of 40 µm, i.e., $Y_A$=40 µm, and I/O cell 202B may have an I/O cell pitch dimension of 80 µm, i.e., $Y_B$=80 µm.

Figure 5:
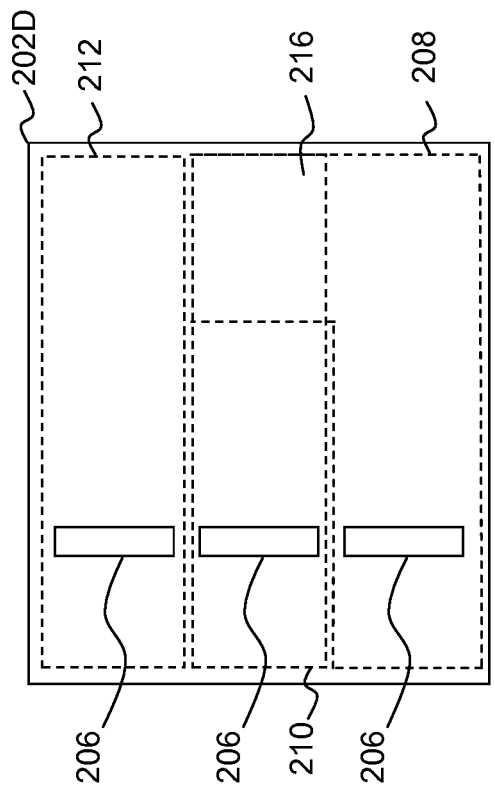
FIG. 5 is a schematic illustration of another example of an I/O cell of an integrated circuit.
Figure 6:
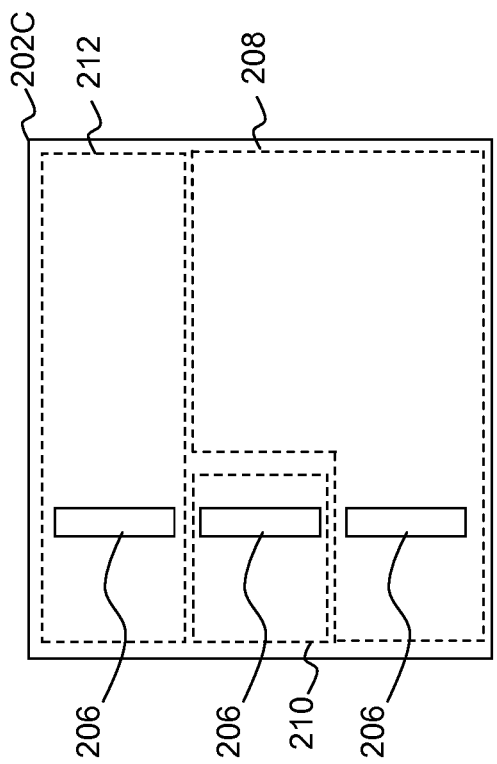
FIG. 6 is a schematic illustration of another example of an I/O cell of an integrated circuit.

Providing I/O cells with an increased number of bonding pads and increased I/O cell pitch dimensions enables a more efficient utilization of the I/O cell area as well as the ability to reallocate and/or combine the resources of an I/O cell, compared to I/O cells that include only a single function and I/O pad. FIGS. 5 and 6 are illustrative examples of the various ways in which the area of I/O cell 206 and resources of the different circuitry of I/O cell 202 may be utilized and shared. For example, FIG. 5 illustrates one example of an I/O cell 202C in which circuit 208 has a greater area requirement than circuits 210 and is allocated more area of I/O cell 202C than circuits 208 and 210. In FIG. 6, circuitry 208 and 210 of I/O cell 200D share resources as designated by reference numeral 216 such as, for example, metal interconnects and routing.

The allocation and/or sharing of resources among the different circuits in an I/O cell 202 enables the interconnects between different I/O circuits to be shortened, which increases the speed at which data may be transmitted by the network of I/O cells. Additionally, allocating the metal resources of the different circuits in an I/O cell also helps to alleviate electromigration ("EM") issues as additional metal may be allocated to counteract the reduction in width of the metal routing and interconnects, which are continually reduced in accordance with more advanced technology specifications.

Figure 7:
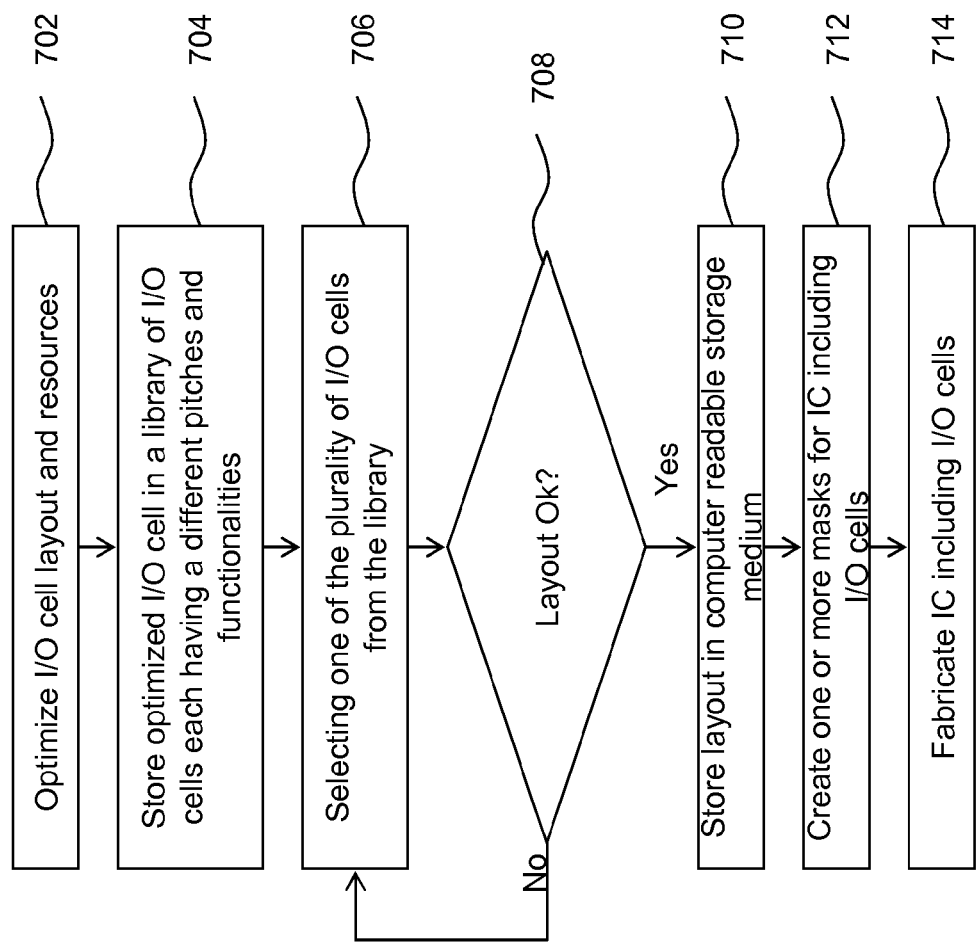
FIG. 7 is one example of a flow diagram of a method of designing and fabricating an integrated circuit.
Figure 8:
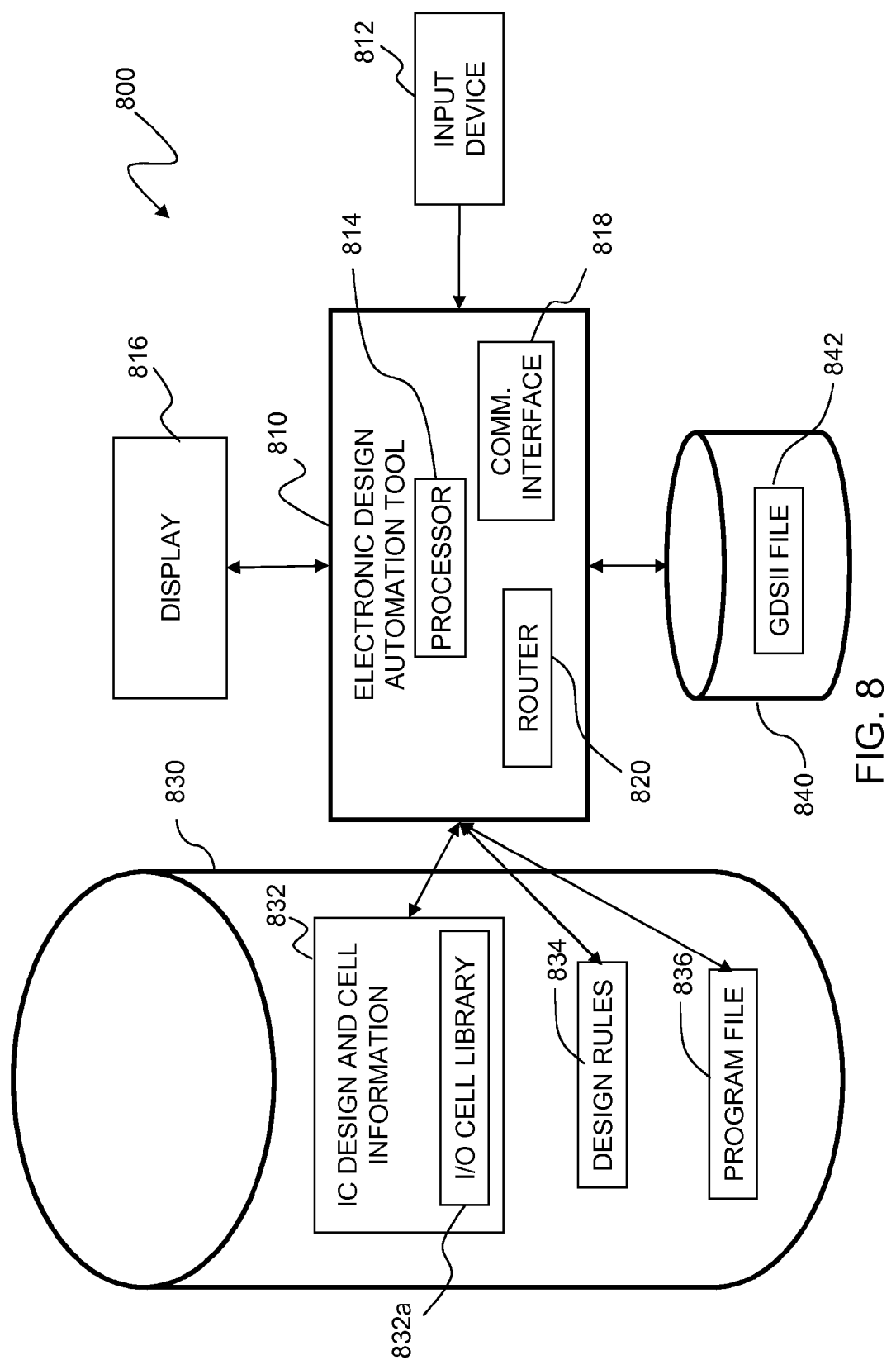
FIG. 8 is a block diagram of one example of a system for performing some or all of the steps of the method illustrated in FIG. 7.

A flow diagram of one example of a method of designing and fabricating an IC including an improved I/O cell architecture is illustrated in FIG. 7. The method illustrated in FIG. 7 may be entirely or partially implemented in a system, such as system 800 illustrated in FIG. 8. System 800 includes an electronic design automation ("EDA") tool 810 such as "IC COMPILER"™, sold by Synopsis, Inc. of Mountain View, Calif., having a router 820 such as "ZROUTE"™, also sold by Synopsis. Other EDA tools 810 may be used, such as, for example, the "VIRTUOSO" custom design platform or the Cadence "ENCOUNTER" digital IC design platform along with the "VIRTUOSO" chip assembly router 820, all sold by Cadence Design Systems, Inc. of San Jose, Calif.

The EDA tool 810 is a special purpose computer formed by retrieving stored program instructions 836 from a computer readable storage medium 830, 840 and executing the instructions on a general purpose processor 814. Processor 814 may be any central processing unit (CPU), microprocessor, microcontroller, or computational device or circuit for executing instructions. The computer readable storage medium 830, 840 may be a random access memory (RAM) and/or a more persistent memory, such as a ROM. Examples of RAM include, but are not limited to, static random-access memory ("SRAM"), or dynamic random-access memory ("DRAM"). A ROM may be implemented as a programmable read-only memory ("PROM"), an erasable programmable read-only memory ("EPROM"), or an electrically erasable programmable read-only memory ("EEPROM") as will be understood by one skilled in the art.

System 800 may include a display 816 and user interface or input device 812 such as, for example, a mouse, a touch screen, a microphone, a trackball, a keyboard, or like device through which a user may input design and layout instructions to system 800. The one or more computer readable storage mediums 830, 840 may store data input by a user such as IC design and cell information 832, which may include an I/O cell library 832a, design rules 834, one or more program files 836, and one or more graphic database system ("GDS") II files 842.

EDA tool 810 may also include a communication interface 818 allowing software and data to be transferred between EDA tool 810 and external devices. Examples of a communications interface 818 may include a modem, Ethernet card, wireless network card, a Personal Computer Memory Card International Association ("PCMCIA") slot and card, or the like. Software and data transferred via communications interface 818 may be in the form of signals, which may be electronic, electromagnetic, optical, or the like that are capable of being received by communications interface 818. These signals may be provided to communications interface 818 via a communications path (e.g., a channel), which may be implemented using wire, cable, fiber optics, a telephone line, a cellular link, a radio frequency ("RF") link and other communication channels.

Router 820 is capable of receiving an identification of a plurality of cells to be included in an IC layout, including a list 832 of pairs of cells, selected from the I/O cell library 832a, within the plurality of cells to be connected to each other. Design rules 834 may be used for a variety of processing technologies (e.g., technology greater than, less than, or equal to 32 nm). In some embodiments, the design rules 834 configure the router 820 to locate connecting lines and vias on a manufacturing grid. Other embodiments may allow the router to include off-grid connecting lines and/or vias in the layout.

Referring again to FIG. 7, an I/O cell is created and optimized at block 702. For example, the area and resources of the I/O cells may be reallocated and modified across the multifunction circuitry as described above. As described above, the circuitry in each I/O cell may be allocated more or less space depending on the resource requirements of the circuitry. Additionally or alternatively, the resources of the I/O cells may be shared by the circuitry within each I/O cell in order to reduce the length of metal interconnects and routing in order to increase the speed at which data may be transmitted to and from the IC by the I/O cells and/or to allocate additional metal resources to help alleviate EM issues.

An electronic file of the optimized I/O cell is stored in a library 832a of I/O cells at block 704. The library of I/O cells 832a may include a plurality of I/O cells each having different pitch dimensions. At block 706, a first I/O cell is selected from the plurality of I/O cells in I/O cell library 832a and is arranged on an electronic model of an integrated circuit. This electronic model of the integrated circuit and the arrangement of the plurality of I/O cells on the electronic model may be displayed to a user on display 816. Additionally, the selection and arrangement of the first I/O cell may be made by a user through input device 812, which causes the processor to cause adjust the images displayed on display 816 as will be understood by one skilled in the art. As described above, the I/O cell may include one or more bonding pads 206 and have an I/O cell pitch dimension that is a multiple of the I/O cell pitch set forth by the ITRS. Additionally, the I/O cell may include circuitry for providing various functionality including, but not limited to, circuitry for supplying the ground and operating voltages, circuitry for providing data transport to/from an IC, and/or ESD protection circuitry.

At decision block 708, a determination is made if the layout of the IC including the I/O cell is approved. If the layout is not approved, then another I/O cell is selected from the plurality of available I/O cells stored in I/O cell library 832a at block 706. The newly selected I/O cell may have a different I/O cell pitch and/or different number of bonding pads 206 than the previously selected I/O cell. The I/O cell may be arranged on the electronic model of the IC. This iteration may be continually repeated until the layout is approved.

Once the layout is approved at decision block 708, the layout of the IC is stored in a computer readable storage medium at block 710. The model of the IC may be stored in GDSII format as will be understood by one skilled in the art.

At block 712, the GDSII file is used by mask making equipment, such as an optical pattern generator, to generate one or more masks for the IC including the I/O cells. At block 714, router 820 may fabricate the IC including the I/O cells on a semiconductor wafer as will be understood by one skilled in the art.

In some embodiments, a system includes a computer readable storage medium and a processor. The computer readable storage includes data representing an input/output ("I/O") cell of a first type for modeling and/or fabricating a semiconductor device. The I/O cell of the first type includes circuitry for providing a first plurality of functions. The processor is in communication with the computer readable storage medium and is configured to select the I/O cell of the first type, arrange a plurality of the I/O cells of the first type on a model of an semiconductor device, and store the model of the semiconductor device including the plurality of the I/O cells of the first type in the computer readable storage medium.

In some embodiments, a system includes a processor in communication with a computer readable storage medium. The computer readable storage medium includes a first storage medium portion containing data of an I/O cell of a first type for providing a first plurality of functions, and a second storage medium portion containing data of an I/O cell of a second type for providing a second plurality of functions. The processor is configured to arrange a plurality of I/O cells of a first or second first type on a model of an integrated circuit and store the model of the integrated circuit including the plurality of the I/O cells of the first or second type in the computer readable storage medium.

In some embodiments, a method includes allocating a resource of a first circuit of a first input/output ("I/O") cell of a first type for modeling and/or fabricating a semiconductor device to a second circuit of the first I/O cell of the first type. The I/O cell of the first type is stored in a library of a computer readable storage medium, and the I/O cell of the first type is selected from a plurality of available I/O cell types in the library. A mask for an integrated circuit is created based on a electronic representation of the integrated circuit including at least one of the I/O cells of the first type.

The improved I/O cell architecture described herein in which a single I/O cell includes a plurality of circuits for providing multiple functions advantageously enables the resources to be allocated and/or shared across the circuits of an I/O cell. Creating and providing a library of I/O cells having various I/O cell pitch dimensions and functionalities enables a designer to optimize the layout of the I/O cells on the semiconductor wafer compared to conventional libraries that merely provide a list of I/O cells each having a single specific function. The ability to reallocate and/or share resources helps reduce the overall size of an I/O cell array, which helps reduce the length of interconnects thereby increasing the speed at which data may be transferred by the I/O cells. Additionally, the reallocation and/or sharing of resources helps reduce the likelihood of EM by increasing the amount of available metal to a circuit that provides power to and from the IC.

The present invention may be at least partially embodied in the form of computer-implemented processes and apparatus for practicing those processes. The present invention may also be at least partially embodied in the form of computer program code embodied in tangible machine readable storage media, such as RAMs, ROMs, CD-ROMs, DVD-ROMs, BD-ROMs, hard disk drives, flash memories, or any other machine-readable storage medium, wherein, when the computer program code is loaded into and executed by a computer, the computer becomes an apparatus for practicing the invention. The present invention may be embodied at least partially in the form of computer program code, whether loaded into and/or executed by a computer, such that, when the computer program code is loaded into and executed by a computer, the computer becomes an apparatus for practicing the invention. When implemented on a general-purpose processor, the computer program code segments configure the processor to create specific logic circuits. The invention may alternatively be at least partially embodied in a digital signal processor formed of application specific integrated circuits for performing a method according to the principles of the invention.

Although the systems and methods have been described in terms of exemplary embodiments, they are not limited thereto. Rather, the appended claims should be construed broadly, to include other variants and embodiments of the disclosed systems and methods, which may be made by those skilled in the art without departing from the scope and range of equivalents of the systems and methods. Delimiters used in the claims—such as 'a)' and 'i)'—should not be taken as imputing any order to the claims, but rather are provided only to serve as visual cues to add in the parsing of the claims and as identifiers in the event that a particular portion of the claim is to be later referenced.

What is claimed is:

1. A system, comprising:
   a computer readable storage medium including data representing an input/output ("I/O") cell of a first type for modeling and/or fabricating a semiconductor device, the I/O cell of the first type including circuitry for providing a first plurality of functions and including a number of bonding pads, wherein a pitch of the I/O cell of the first type is based on the number bonding pads within the I/O cell; and
   a processor in communication with the computer readable storage medium, the processor configured to
   a) select the I/O cell of the first type,
   b) arrange a plurality of the I/O cells of the first type on a model of an semiconductor device, and
   c) store the model of the semiconductor device including the plurality of the I/O cells of the first type in the computer readable storage medium.

2. The system of claim 1, wherein the computer readable storage medium includes data representing an I/O cell of a second type having an I/O cell pitch that is different than an I/O cell pitch of the I/O cell of the first type.

3. The system of claim 1, wherein the I/O cell of the first type includes a first node for coupling to a first power supply and a second node coupled to a circuit for providing a first function.

4. The system of claim 3, wherein the first function of the I/O cell of the first type is protection from electrostatic discharge.

5. The system of claim 3, wherein the first power supply provides the operating power for the integrated circuit.

6. The system of claim 1, wherein the processor is configured to
   d) arrange a first one of an I/O cell of a second type on the model of the integrated circuit, the I/O cell of the second type configured to provide a plurality of functions and having an I/O cell pitch that is different than an I/O cell pitch of the I/O cell of the first type; and
   e) remove the first one of the I/O cell of the second type from the model of the integrated circuit.

7. The system of claim 1, wherein the processor is configured to
   d) allocate a metal resource of a first circuit that is configured to provide a first function of the I/O cell of the first type to a second circuit that is configured to provide a second function of the I/O cell of the first type; and
   e) store data of the I/O cell of the first type in the computer readable storage medium.

8. The system of claim 1, wherein the computer readable storage medium includes data for I/O cells for a plurality of different types for modeling and/or fabricating a semiconductor device, each of the I/O cells of the plurality of different types having an I/O cell pitch that is different from an I/O cell pitch of at least one of the other I/O cells.

9. A system, comprising:
a computer readable storage medium including
  a first storage medium portion containing data of an I/O cell of a first type for providing a first plurality of functions and including a first number of bonding pads, the I/O cell of the first type having a pitch that is based on the first number of bonding pads within the I/O cell of the first type, and
  a second storage medium portion containing data of an I/O cell of a second type for providing a second plurality of functions and including, a second number of bonding pads, the I/O cell of the second type having a pitch that is based on the second number of bonding pads with the I/O cell of the second type; and
a processor in communication with the computer readable storage medium, the processor configured to
  arrange a plurality of I/O cells of a first or second first type on a model of an integrated circuit, and
  store the model of the integrated circuit including the plurality of the I/O cells of the first or second type in the computer readable storage medium.

10. The system of claim 9, wherein an I/O cell pitch of the I/O cell of the first type is different from an I/O cell pitch of the I/O cell of the second type.

11. The system of claim 10, wherein the I/O cell pitches of the I/O cells of the first and second types are based on a number of functions provided by the I/O cells of the first and second types.

12. The system of claim 9, wherein the I/O cell of the first type includes a first node for coupling to a first power supply and a second node coupled to a circuit for providing a first function.

13. The system of claim 12, wherein the first function is protection from electrostatic discharge.

14. The system of claim 12, wherein the first power supply provides the operating power for the integrated circuit.

15. The system of claim 9, wherein the processor is configured to:
  cause a first one of the I/O cells of the second type to be displayed to a user on a display; and
  cause the first one of the I/O cells of the second type to be removed from the display.

16. The system of claim 9, wherein the processor is configured to modify the first storage medium portion such that a resource of a first circuit of the I/O cell of the first type is allocated to a second circuit of the I/O cell of the first type.

17. The system of claim 9, wherein the processor is configured to
  generate data representing a physical layout of an integrated circuit including a plurality of the I/O cells of the first type or a plurality of the I/O cells of the second type; and
  store the data in a third computer storage medium portion.

18. A method, comprising:
a) allocating a resource of a first circuit of a first input/output ("I/O") cell of a first type for modeling and/or fabricating a semiconductor device to a second circuit of the first I/O cell of the first type, wherein a pitch of the I/O cell of the first type is based on a number bonding pads within the I/O cell;
b) storing the I/O cell of the first type in a library of a computer readable storage medium;
c) selecting the I/O cell of the first type from a plurality of available I/O cell types in the library; and
d) creating a mask for an integrated circuit based on an electronic representation of the integrated circuit including at least one of the I/O cells of the first type.

19. The method of claim 18, further comprising:
e) fabricating a semiconductor device using the mask.

20. The method of claim 18, wherein the plurality of functions includes data transfer to and/or from the integrated circuit and protecting the integrated circuit from electrostatic discharge.

* * * * *